(12) United States Patent
Burns

(10) Patent No.: US 7,909,284 B2
(45) Date of Patent: Mar. 22, 2011

(54) WIRE SPOOL ALIGNMENT METHOD IN WIRE FEED WELDING SYSTEMS

(75) Inventor: Marlin Eugene Burns, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/402,400

(22) Filed: Mar. 11, 2009

(65) Prior Publication Data

US 2009/0236462 A1    Sep. 24, 2009

Related U.S. Application Data

(60) Provisional application No. 61/038,139, filed on Mar. 20, 2008.

(51) Int. Cl.
*B65H 16/04* (2006.01)
*B65H 59/02* (2006.01)
(52) U.S. Cl. .................. 242/597.5; 242/423.1
(58) Field of Classification Search ............... 242/396.9, 242/423, 423.1, 423.2, 578, 578.1, 597.5, 242/597.6, 578.2, 578.3
See application file for complete search history.

(56) References Cited

U.S. PATENT DOCUMENTS

| | | | | |
|---|---|---|---|---|
| 1,053,612 | A | * | 2/1913 | Keyes ........................ 242/597.4 |
| 1,234,746 | A | * | 7/1917 | Fish ........................... 242/578.2 |
| 2,905,408 | A | * | 9/1959 | Stetka et al. ............... 242/578.2 |
| 4,190,211 | A | * | 2/1980 | Janzen ........................ 242/423.1 |
| 4,625,931 | A | * | 12/1986 | Tamura et al. ............. 242/423.1 |
| 4,885,453 | A | * | 12/1989 | Martin ........................ 242/423.1 |
| 5,725,175 | A | * | 3/1998 | Thundathil ................ 242/423.2 |
| 7,034,250 | B2 | * | 4/2006 | Kensrue ..................... 242/423.1 |

* cited by examiner

*Primary Examiner* — William A Rivera
(74) *Attorney, Agent, or Firm* — Fletcher Yoder, PC

(57) ABSTRACT

A novel system for mounting welding wire spools of different sizes on a mounting spindle of a wire feed system is provided. The invention may reduce or eliminate wire feedability difficulties and welding arc outages arising from misalignment of the wire spool and inconsistent wire feeds. The invention provides a medium and large wire spool mounting system including a spool mounting hub, a movable back plate configured with a locking slot arrangement, and a left threaded nut plate. Furthermore, the invention provides a system for mounting small wire spools on a keyed shaft of a wire feed system comprised of washers, a spring, and a knurled nut. A braking system including washers, a spring, and a knurled nut is provided for the prevention of wire spool free wheeling during non-welding periods.

20 Claims, 5 Drawing Sheets

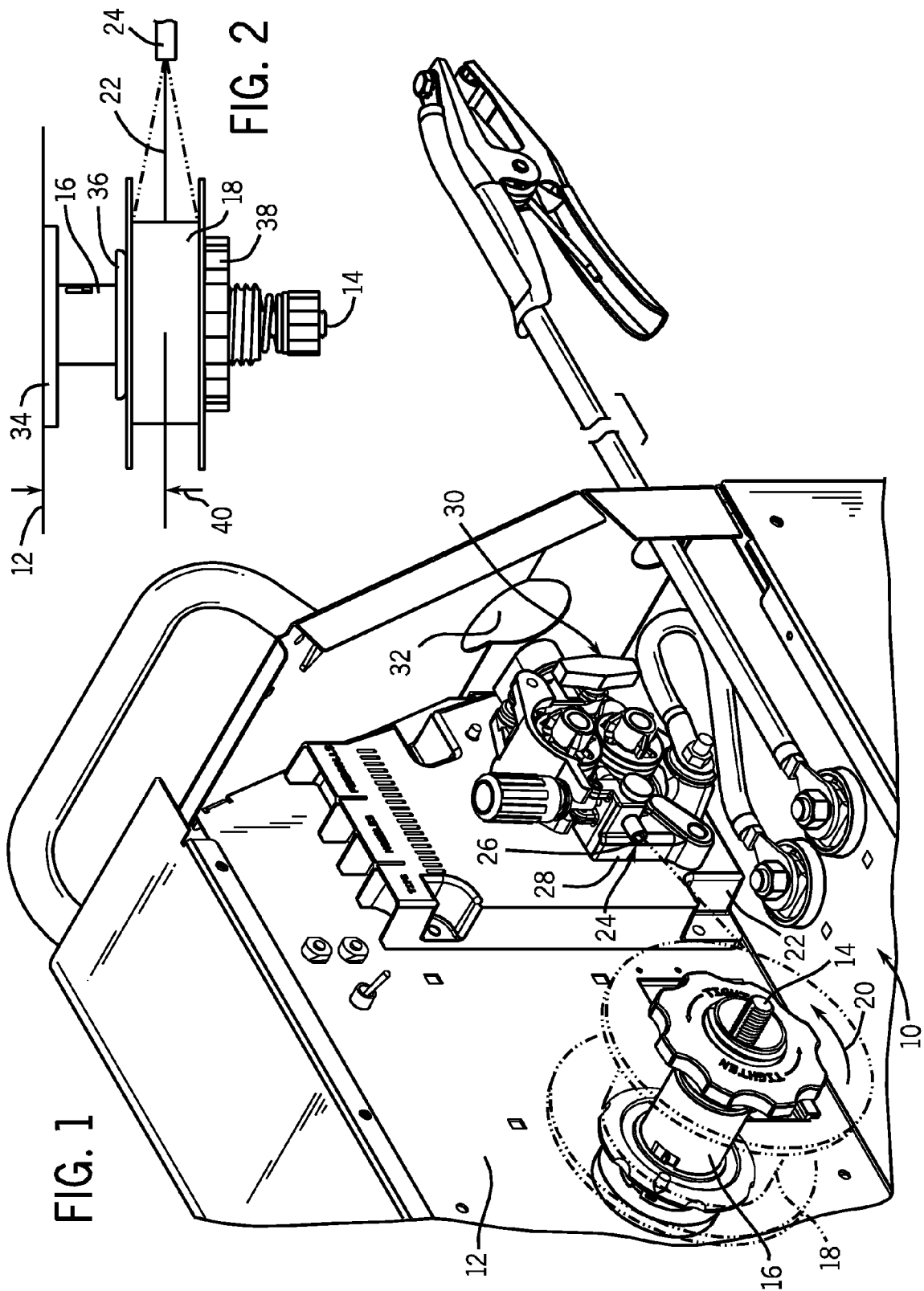

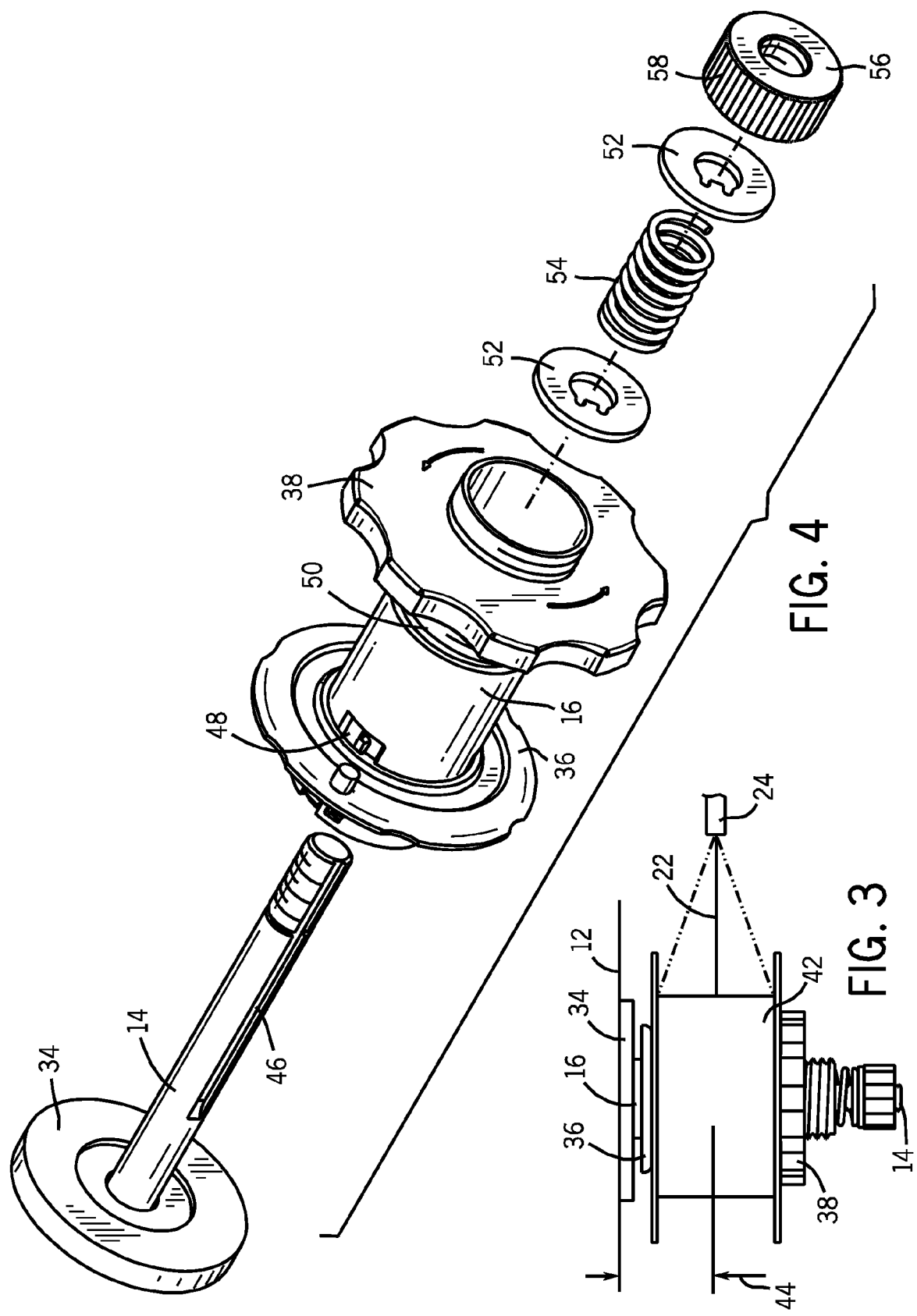

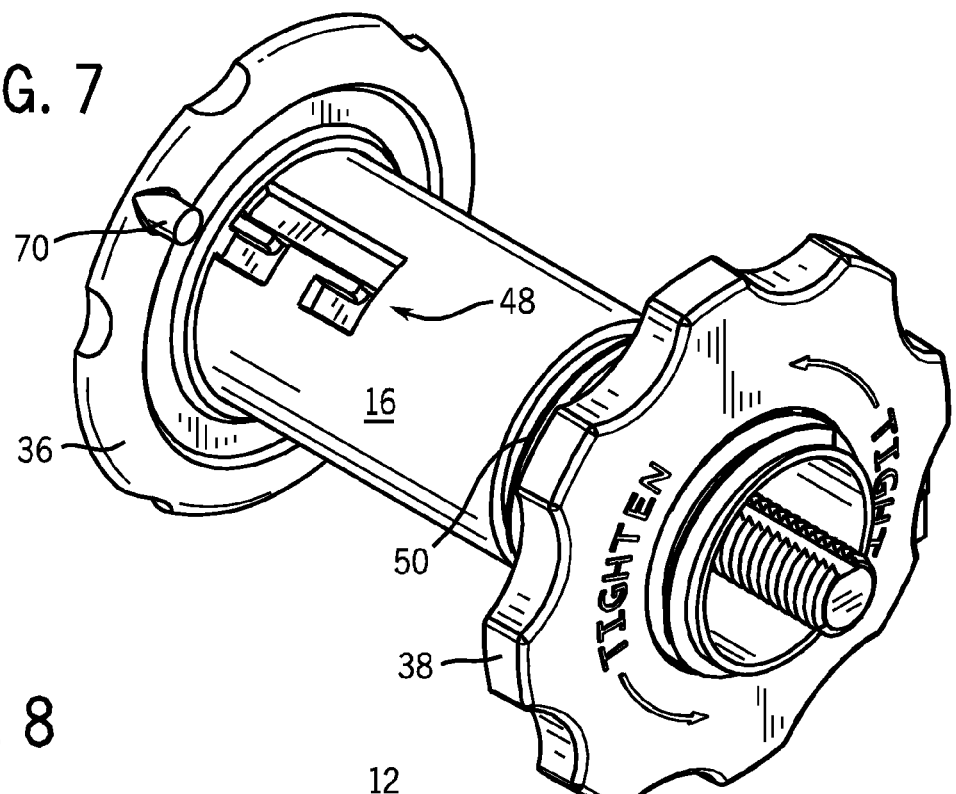
FIG. 7
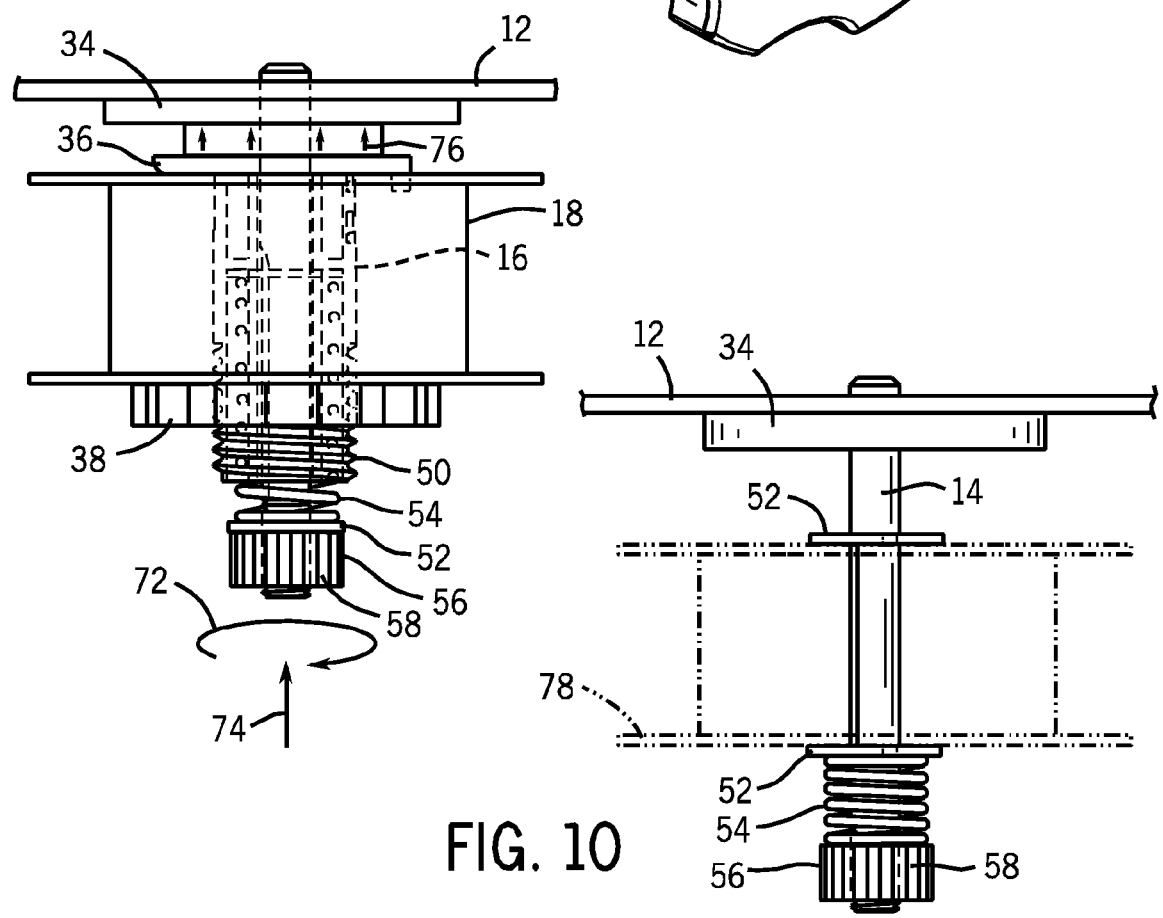
FIG. 8
FIG. 10

WIRE SPOOL ALIGNMENT METHOD IN WIRE FEED WELDING SYSTEMS

CROSS REFERENCE TO RELATED APPLICATIONS

This application is a Non-provisional Patent Application of U.S. Provisional Patent Application No. 61/038,139, entitled "Wire Spool Alignment Method in Wire Feed Welding Systems", filed Mar. 20, 2008, which is herein incorporated by reference.

BACKGROUND

The invention relates generally to welding systems and welding wire feed systems, and more particularly, to systems and methods for mounting welding wire spools of different sizes on a mounting spindle.

Many types of welding systems utilize continuously fed consumable wire from a welding gun during welding operation. This wire is provided by manufacturers on wire spools with varying widths and diameters. Common welding applications require spools with widths ranging from 1.75 to 4.25 inches. These spools are placed on a mounting spindle, which is designed to accommodate the largest spool width, for use during welding. Traditionally, a single retaining mechanism is placed on the end of the mounting spindle to prohibit the wire spool from dislodging and to ensure a tight fit.

While this system works well for the largest wire spools, alignment and excessive wear problems arise when mounting smaller wire spools. For instance, a spool with a 1.75 inch width will be secured in a position that results in wire being spooled from the wire spool to the wire drive mechanism of the welder at a misaligned angle. This can lead to excessive wear on the inlet guide of the wire drive mechanism and disruption of the weld due to inconsistent wire feeding. Therefore, there exists a need for improved mounting techniques that can offer better welding wire spool alignment for a range of wire spool sizes. Such techniques could be used in both large scale commercial and small scale private welding operations.

BRIEF DESCRIPTION

The present invention provides a novel system for mounting welding wire spools of different sizes on a mounting spindle of a wire feed system designed to respond to such needs. The invention may reduce or eliminate wire feedability difficulties and welding arc outages arising from misalignment of the wire spool and inconsistent wire feeds. In particular, the invention provides a wire spool mounting system including a spool mounting hub with a movable back plate. The movable back plate has a locking slot arrangement that allows for accommodation of multiple spool widths. The invention provides a system for mounting small wire spools on a shaft of a wire feed system comprised, in certain presently contemplated embodiments, of washers, a spring, and a knurled nut. A braking system including washers, a spring, and a knurled nut may be provided for the prevention of wire spool free wheeling during non-welding periods.

DRAWINGS

These and other features, aspects, and advantages of the present invention will become better understood when the following detailed description is read with reference to the accompanying drawings in which like characters represent like parts throughout the drawings, wherein:

FIG. 1 illustrates a wire feed system with a spool mounting hub in accordance with aspects of the present invention;

FIG. 2 is a top plan view of an exemplary spool mounting hub on a keyed shaft with a medium sized spool;

FIG. 3 is a top plan view of an exemplary spool mounting hub on a keyed shaft with a large spool;

FIG. 4 is an exploded view of the keyed shaft and the exemplary spool mounting hub assembly;

FIG. 7 is a perspective view of an exemplary spool mounting hub with a moveable back plate in the second slot and a threaded nut plate;

FIG. 8 is a top plan view of an exemplary wire feed braking system in accordance with aspects of the present invention;

FIG. 10 is a top plan view of the exemplary mounting system for small spools of FIG. 9.

DETAILED DESCRIPTION

Figure 5:
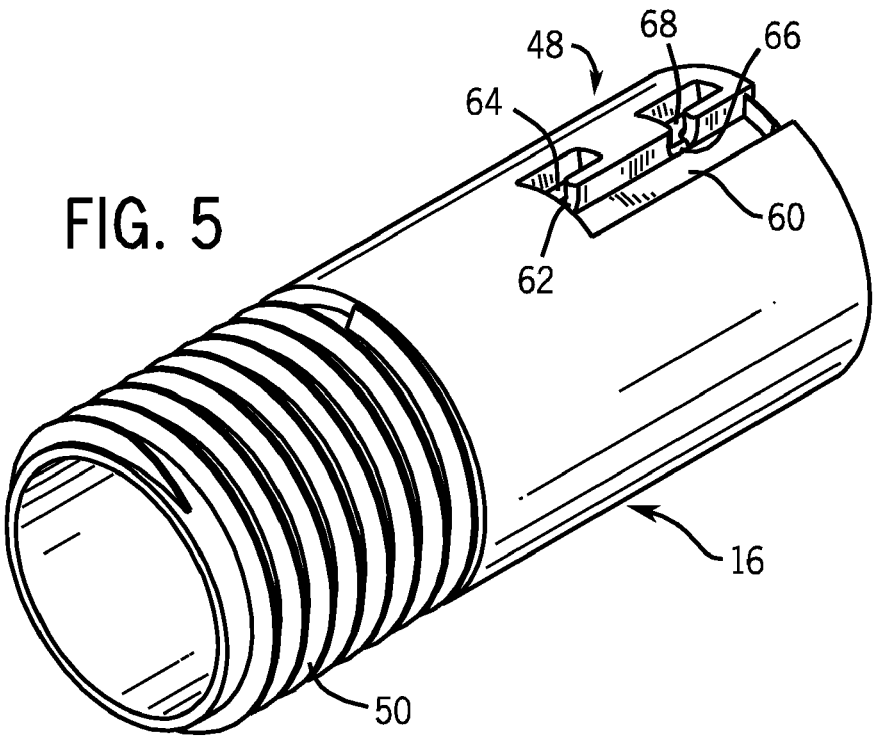
FIG. 5 illustrates an exemplary spool mounting hub showing the locking slot arrangement.

FIG. 1 illustrates a wire feed system 10 that supplies a welding operation. The welding operation will typically be a metal inert gas (MIG) operation that utilizes a continuous feed of welding wire as an electrode and consumes the wire during the operation. As will be appreciated by those skilled in the art, however, similar operations may be performed in which weldments are formed without shielding gases, such as by the use of flux-cored wire. The system described herein is envisaged for use with all such operations where spools of wire of different sizes, widths, and diameters are fed to a location where welding is carried out.

In the system illustrated, a back wall 12 is permanently affixed to a keyed shaft 14, which extends outward and contains threads at its outer end. A spool mounting hub 16 fits onto the keyed shaft 14 and properly positions a wire spool 18 that can rotate on the shaft and/or hub to feed wire for welding. In certain embodiments, the spool 18 may have one of several different standard sizes, and the spool mounting hub 16 is adjustable to ensure proper alignment. The wire spool 18 rotates in the indicated direction 20 to feed wire 22 into the inlet guide 24, which contains an aperture 26 through which the wire 22 enters. The wire 22 is fed through the feed head assembly 28 into the wire drive assembly 30. Upon exiting, the wire 22 is fed through an opening 32 for use in the welding operation. Due to the direction of rotation of the spool, left-hand threading on the spool mounting hub 16 ensures that the wire spool 18 does not become dislodged (i.e., loosened by unthreading) during this wire feed operation. If the direction of turning of the spool were reversed, this feature of the arrangement may also be changed (e.g., for right-hand threading).

FIG. 2 is a top plan view of the exemplary spool mounting hub 16 holding the medium wire spool 18 on the keyed shaft 14 of FIG. 1. A wear plate 34 is positioned on the keyed shaft 14 flat against the back wall 12. The spool mounting hub 16 is then positioned on the keyed shaft 14. The mounting hub 16 holds a movable back plate 36, a wire spool 18, and a threaded nut plate 38. The movable back plate 36 adjusts inwardly and outwardly to accommodate various spool widths. In certain embodiments, the back plate 36 may have two or more possible positions. In a presently contemplated embodiment, the threaded nut plate 38 is secured on the hub 16 with left-hand threads. The spool hub assembly positions the wire spool 18 such that a centering distance 40 is established, causing the wire 22 to be properly aligned as it feeds into the inlet guide 24.

FIG. 3 is a top plan view of the exemplary spool mounting hub 16 holding a large wire spool 42 on the keyed shaft 14. A wear plate 34 is positioned on the keyed shaft 14 flat against the back wall 12. The spool mounting hub 16 is then positioned on the keyed shaft 14. The mounting hub 16 holds a movable back plate 36, a large wire spool 42, and a threaded nut plate 38. The movable back plate 36 is adjusted outward to accommodate the large spool width. The threaded nut plate 38 is secured on the hub 16 with left threads. The spool hub assembly positions the large wire spool 42 such that a centering distance 44 is established, causing the wire 22 to be properly aligned as it feeds into the inlet guide 24. The centering distance 44 for the large wire spool 42 is approximately equal to the centering distance 40 for the medium wire spool. The positions of the back plate 34 and the threaded nut plate 38 adjust to keep this distance 44 approximately constant for various wire spool widths, ensuring proper wire alignment for all spool sizes.

FIG. 4 is an exploded view of the assembly of the spool mounting hub 16 that secures and aligns wire spools for welding. The keyed shaft 14 extends out from the wear plate 34, which provides a base for the parts of the assembly. The keyed shaft 14 has a keyway 46, which extends approximately 75% of the way down the shaft 14 toward the wear plate 34. The movable back plate 36 connects to the locking slot arrangement 48 on the spool mounting hub 16. The threaded nut plate 38 mounts on the left threads 50 on the opposite end of the spool mounting hub 16 and tightens in the opposite direction of the wire spool feed. A keyed washer 52 is then mounted on the keyed shaft 14. A spring 54 is provided to secure the assembly in the desired position and prevent the wire spool from unraveling when a welding operation is not occurring (e.g., by applying a preload force to the assembly). An outer keyed washer 52 is then added followed by a knurled nut 56. The user may tighten the nut 56 by gripping threads 58 to manually adjust the force on the hub assembly.

FIG. 5 is a perspective view of the spool mounting hub 16 illustrating the left threads 50 on the outer end and the locking slot arrangement 48 on the other end. The movable back plate 36 slides onto the axial common slot 60 during use. For smaller spools, the back plate 36 then rotates clockwise through the first circumferential extension 62 and slides axially back into the first locking recess 64. For larger spools, after sliding onto the axial common slot 60, the back plate 36 rotates clockwise through the second circumferential extension 66 and slides axially back into the second locking recess 68. Certain embodiments may have more or less recesses than the spool mounting hub 16 shown.

Figure 6:
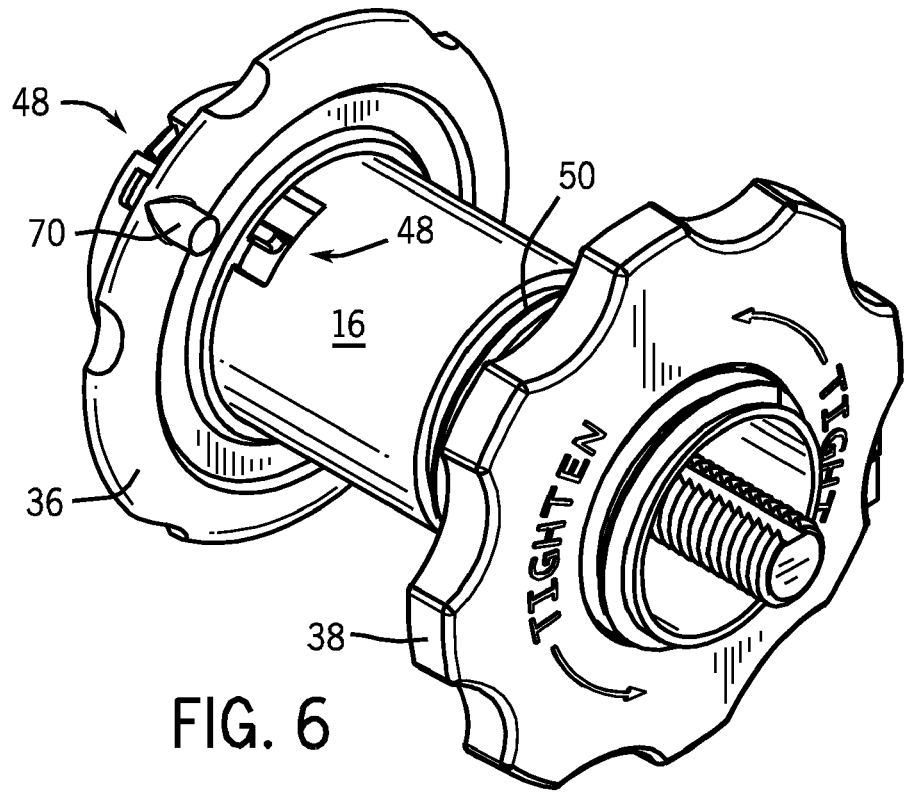
FIG. 6 is a perspective view of an exemplary spool mounting hub with a moveable back plate in the first slot and a threaded nut plate.

FIG. 6 illustrates the spool mounting hub 16 with the movable back plate 36 secured in the first locking recess 64 of the locking slot arrangement 48. The back plate provides an extension 70, which fits into the wire spool during use. FIG. 7 illustrates the spool mounting hub 16 of FIG. 6 with the movable back plate 36 secured in the second locking recess 68 of the locking slot arrangement 48. The threaded nut plate 38 tightens onto the left threads 50 in the indicated direction and provides circular indentations for the user to grip. As previously mentioned, the left threading ensures that the threaded nut plate 38 does not unthread during wire feeding.

FIG. 8 is a top plan view of the spool mounting hub assembly illustrating a braking system provided to keep the wire spool 18 from free wheeling when wire is not being fed to the welding operation. The wear plate 34 sits against the back wall 12. The spool mounting hub 16 with the movable back plate 36, the wire spool 18, and the threaded nut plate 38 are mounted on the keyed shaft 14. When the knurled nut 56 is turned in the indicated direction 72, a lateral force, as indicated by reference numeral 74, applies pressure to the keyed washer 52 that compresses the spring 54. Spring compression leads to a force 76 against the wear plate 34 and the back wall 12. This pressure prevents undesirable unwinding of the wire spool 18 when welding is not occurring.

Figure 9:
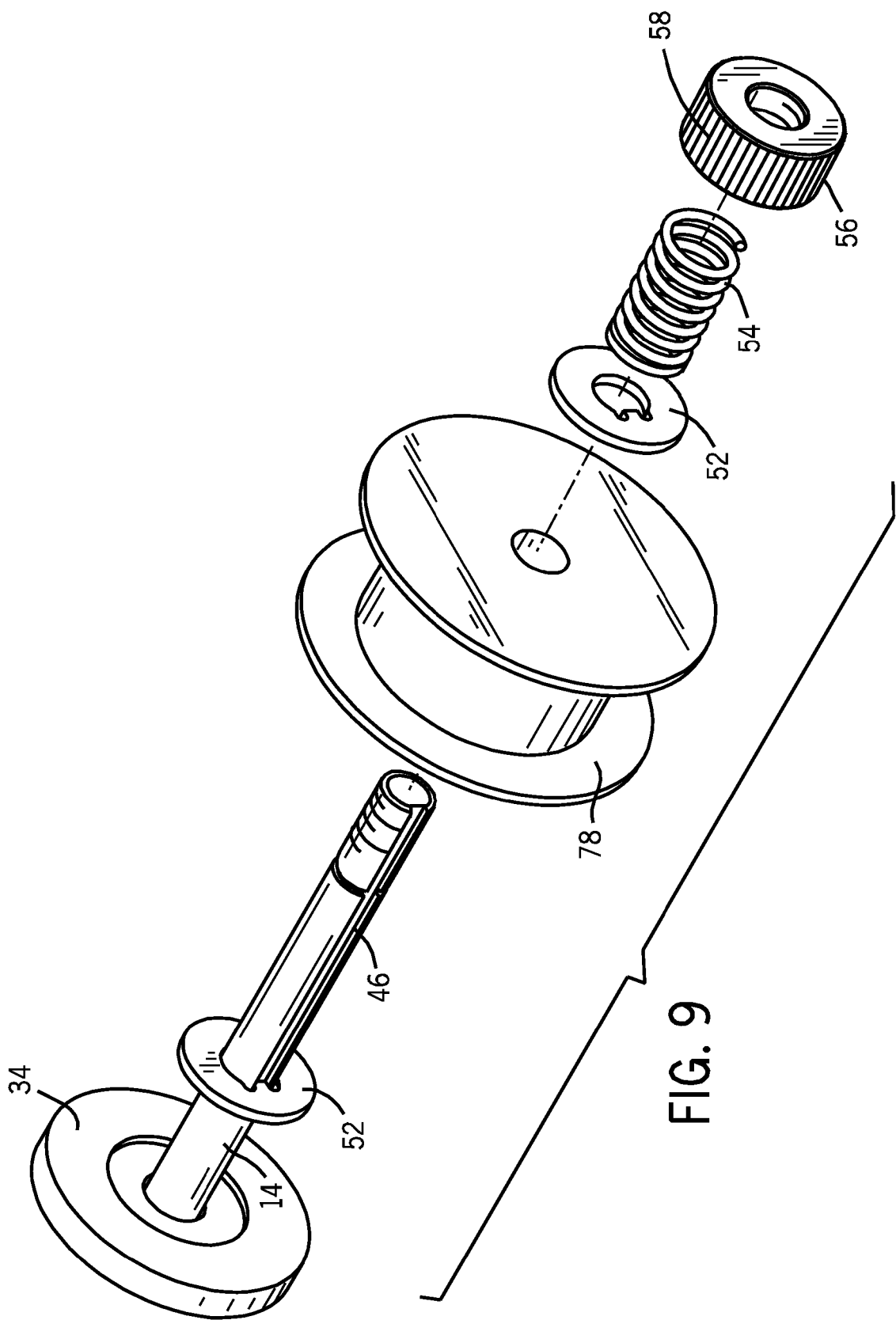
FIG. 9 is an exploded view of the keyed shaft and the exemplary mounting system for small spools in accordance with aspects of the present invention.

FIG. 9 is an exploded view of an exemplary mounting system for small spools 78 in accordance with aspects of the present invention. The keyed shaft 14 extends outward from the wear plate 34 and contains a keyway 46 that extends approximately 75% of the way down the shaft 14. The first washer 52 is first mounted in the keyway 46 onto the shaft 14. The small spool 78 is mounted flat against the washer 52. The second washer 52 is then mounted against the second side of the spool 78. Finally, a spring 54 followed by a knurled nut 56 with threads 58 is mounted. A top plan view of this assembled mounting system for small spools 78 is illustrated in FIG. 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for mounting welding wire spools of different sizes on a mounting spindle of a wire feed system, comprising:
   a hub having a central portion for holding wire spools of different sizes, a first end having a locking slot arrangement formed in an outer surface thereof, and a threaded second end, wherein the locking slot arrangement comprises a central axial slot, at least one circumferential extension, and at least one axially disposed locking recess;
   a first plate configured to slide axially through the central axial slot, to slide circumferentially through the circumferential extension, and to slide axially into the axially disposed locking recess to lock within the locking slot arrangement of the first end to limit movement of a wire spool when disposed on the hub and to substantially prevent circumferential rotation of the first plate; and
   a second plate configured to be threaded onto the second end to hold the wire spool between the first and second plates.

2. The system of claim 1, wherein the locking slot arrangement has at least two levels of locking slots to accommodate at least two sizes of wire spools.

3. The system of claim 1, wherein the second end of the hub has left-hand threads to avoid unthreading of the second plate when wire is fed from a bottom of a wire spool.

4. The system of claim 1, wherein the hub is configured to be slid onto a first side of the mounting spindle.

5. The system of claim 4, comprising a spring disposed between the second plate and an adjustable stop to urge the hub towards a second side of the mounting spindle opposite the first side.

6. The system of claim 5, wherein the adjustable stop includes a nut threaded on the mounting spindle.

7. The system of claim 5, comprising a wear plate disposed between the hub and the second side of the mounting spindle, and wherein the spring urges the hub against the wear plate to limit free wheeling of a wire spool mounted on the hub.

8. The system of claim 1, wherein the second end of the hub has left-hand threads to avoid unthreading of the second plate when wire is fed from a bottom of a wire spool.

9. The system of claim 1, wherein the mounting spindle has a slot extending through a portion of its length, and wherein the system comprises a retaining plate configured to slide along the mounting spindle to an end of the slot and to lock in the slot to limit movement of a wire spool mounted directly on the mounting spindle with the hub, the first plate and the second plate removed therefrom.

10. The system of claim 9, comprising a spring configured to urge the wire spool towards the retaining plate.

11. A system for mounting welding wire spools of different sizes in a wire feed system, comprising:
    a mounting spindle having a first end rigidly supported by a support structure, and a threaded second end;
    a hub having a central portion for holding wire spools of different sizes, a first end having a locking slot arrangement formed in an outer surface thereof, and a threaded second end, wherein the locking slot arrangement comprises at least one axially disposed locking recess;
    a first plate configured to slide within the locking slot arrangement and to lock in the at least one axially disposed locking recess to substantially prevent circumferential rotation of the first plate and to limit movement of a wire spool when disposed on the hub;
    a second plate configured to be threaded onto the second end to hold the wire spool between the first and second plates; and
    a nut received on the threaded second end of the spindle.

12. The system of claim 11, comprising a spring disposed between the nut and the hub to urge the hub towards the first end of the spindle.

13. The system of claim 12, comprising a wear plate disposed between the hub and the second side of the spindle, and wherein the spring urges the hub against the wear plate to limit free wheeling of a wire spool mounted on the hub.

14. The system of claim 13, wherein the nut is movable to modify a braking force of the hub against the wear plate.

15. The system of claim 11, wherein the locking slot arrangement has at least two levels of locking slots to accommodate at least two sizes of wire spools.

16. A method for mounting welding wire spools of different sizes on a mounting spindle of a wire feed system, comprising:
    mounting a first plate on a hub, the hub having a central portion for holding wire spools of different sizes, a first end having a locking slot arrangement formed in an outer surface thereof, and a threaded second end, wherein the locking slot arrangement comprises at least one axially disposed locking recess;
    mounting the hub on the mounting spindle;
    adjusting a position of the first plate in the locking slot arrangement to lock in the axially disposed locking recess to substantially prevent circumferential rotation of the first plate based upon the size of a welding wire spool to be disposed on the hub;
    disposing a welding wire spool on the hub; and
    threading a second plate on the second end of the hub to hold the wire spool between the first and second plates.

17. The method of claim 16, comprising threading a nut onto the mounting spindle to retain the hub on the mounting spindle.

18. The method of claim 17, comprising disposing a spring between the nut and the first plate to urge the hub and wire spool onto the spindle.

19. The method of claim 17, comprising adjusting the nut to produce a desired braking force between the hub and a wear plate mounted on the mounting spindle.

20. The method of claim 17, comprising removing the hub, the first plate and the second plate from the mounting spindle and mounting a welding wire spool directly on the mounting spindle between a retaining plate and a biasing spring.

* * * * *